R. MOULIN.
PORTABLE DIFFUSION APPARATUS.
APPLICATION FILED JAN. 7, 1921.
1,377,909. Patented May 10, 1921.
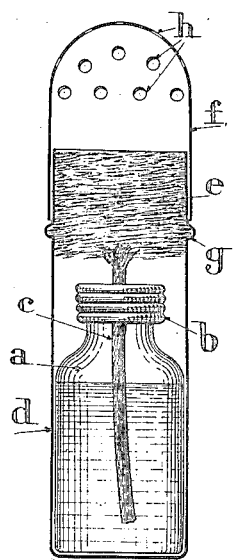
INVENTOR
RENÉ MOULIN
BY Munn & Co
ATTORNEYS

UNITED STATES PATENT OFFICE.

RENÉ MOULIN, OF PARIS, FRANCE.

PORTABLE DIFFUSION APPARATUS.

1,377,909. Specification of Letters Patent. Patented May 10, 1921.

Application filed January 7, 1921. Serial No. 435,676.

*To all whom it may concern:*

Be it known that I, RENÉ MOULIN, a citizen of the French Republic, and residing in Paris, France, 35 Rue Brunel, have invented certain new and useful Improvements in and Relating to Portable Diffusion Apparatus, of which the following is a complete specification.

This invention relates to a portable apparatus for the diffusion of essences or volatile liquids, and comprises a hermetically closed receptacle, containing the liquid to be diffused and having a wick immersed in the liquid and extending out through the metal stopper thereof, so that the liquid is drawn out of the receptacle by capillary attraction and from which it evaporates.

The apparatus above described is contained in a metal case the cover of which is pierced with holes of small diameter. While thus permitting the vapors to escape and saturate the atmosphere, the cover protects objects such as fabrics or the like from all contact with the wick impregnated with the liquid which is contained in the internal receptacle and which might spoil them.

The accompanying drawing represents in vertical section a form of the apparatus according to the invention.

The apparatus comprises a bottle $a$, tightly closed and of suitable construction, and through the stopper $b$ of which extends a wick $c$ which dips into the liquid contained in the bottle.

The bottle is contained in a case $d$ for example of embossed metal which is of a height greater than that of the bottle $a$, the empty space above the bottle being filled with a packing of absorbent material, such for example as absorbent cotton.

The tube $d$ is closed by a cover $f$, held in position by a collar $g$, and having in its upper part a suitable number of perforations $h$, which put the interior of the tube $d$ into communication with the atmosphere.

The bottle $a$ being filled with an essence or a liquid of any kind which is easily vaporizable, the liquid ascends by the wick $c$ until it comes in contact with the absorbent material $e$, in which it diffuses in a state of extreme subdivision. The air above the absorbent material in the cover $f$ diminishes in density in consequence of its mixture with these vapors and consequently escapes through the openings $h$ being constantly replaced by the outer air so that a practically constant circulation of air is set up in the cover which disseminates into the atmosphere the liquid molecules already dispersed in the cotton $e$.

The apparatus may be used for example for the preservation of garments, the garments or other articles to be preserved being inclosed in a room or other receptacle, and one or more of the devices containing a suitable liquid being placed on the floor of the room or receptacle. At the end of a certain time the whole atmosphere of the room or receptacle will be completely saturated with the vapors of the liquid which the bottle $a$ contains.

The apparatus may also be utilized to disseminate perfumes, odors, etc.

What I claim is:

A portable diffusion apparatus, comprising an elongated casing provided with a cover having perforations in its top, a receptacle containing the liquid to be diffused fitting snugly in the casing and provided with an apertured stopper, a wick in the receptacle and extending through the aperture of the stopper thereof, and absorbent cotton in the casing and filling the space in the body of the casing above the end of the wick and with which the wick engages.

In testimony whereof I have hereunto set my hand at Paris, France, this 20th day of December, 1920.

R. MOULIN.